No. 780,750. PATENTED JAN. 24, 1905.
L. R. HEIM & E. TARGETT.
MACHINE FOR SHAPING FOLD COLLARS.
APPLICATION FILED JAN. 17, 1903.

3 SHEETS—SHEET 1.

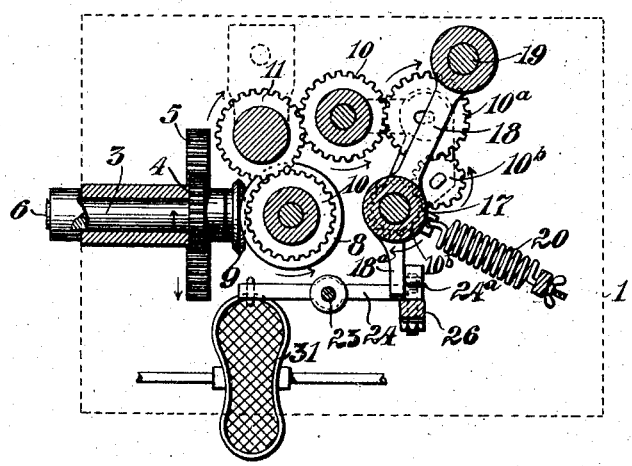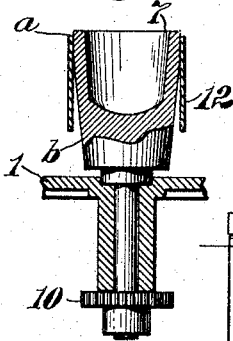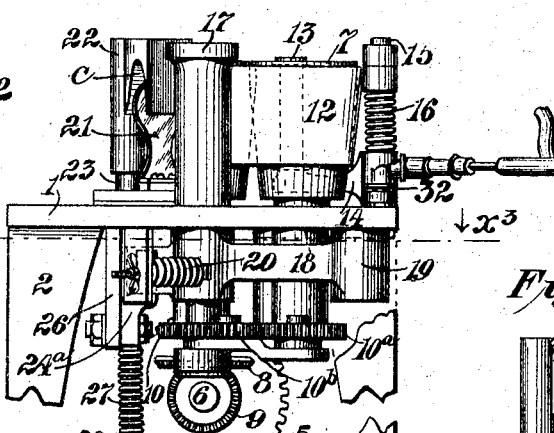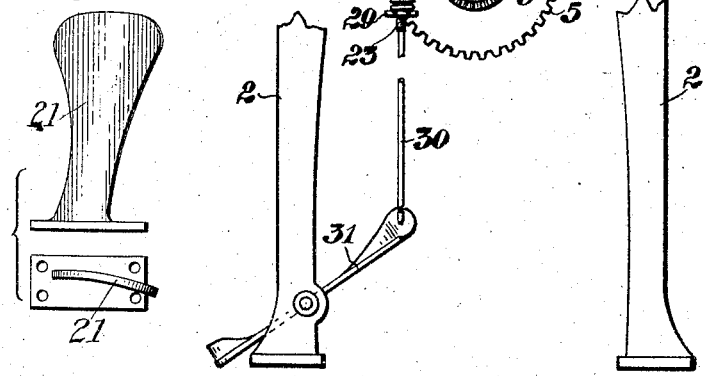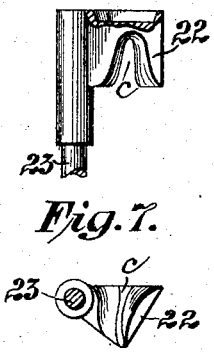

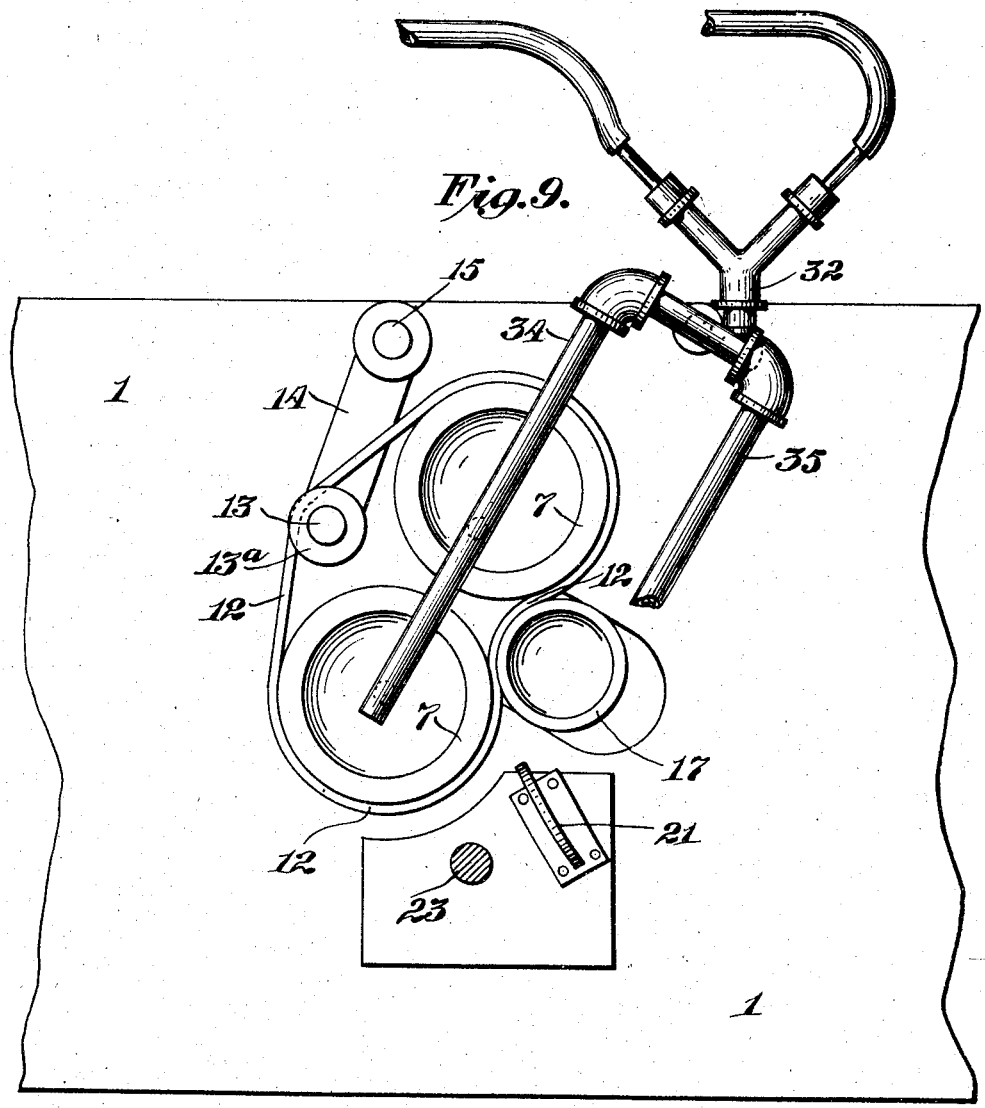

No. 780,750.　　　　　　　　　　　　　　　　　　Patented January 24, 1905.

UNITED STATES PATENT OFFICE.

LEWIS R. HEIM AND EDWIN TARGETT, OF DANBURY, CONNECTICUT; SAID TARGETT ASSIGNOR OF ONE-HALF OF HIS RIGHT TO HENRY M. SIEMON, OF DANBURY, CONNECTICUT.

MACHINE FOR SHAPING FOLD-COLLARS.

SPECIFICATION forming part of Letters Patent No. 780,750, dated January 24, 1905.

Application filed January 17, 1903. Serial No. 139,443.

*To all whom it may concern:*

Be it known that we, LEWIS R. HEIM and EDWIN TARGETT, both citizens of the United States, and residents of Danbury, in the county of Fairfield and State of Connecticut, have jointly invented certain new and useful Improvements in Machines for Shaping Fold-Collars, of which the following is a specification.
This invention relates to the class of machines employed for producing the fold in fold-collars, or "turn-down" collars, as they are sometimes called, and for shaping the collar. In this class of machines the collar is previously ironed flat and moistened along the line of the fold, and is folded and shaped under the combined influences of heat and pressure applied in a moderate degree.

The present invention has for its object to provide a machine of this class which may be operated rapidly, which will form a close folded edge on the collar and iron the same smoothly and evenly without injury to the material of the collar, and which will dry out any surplus moisture.

Figure 1:
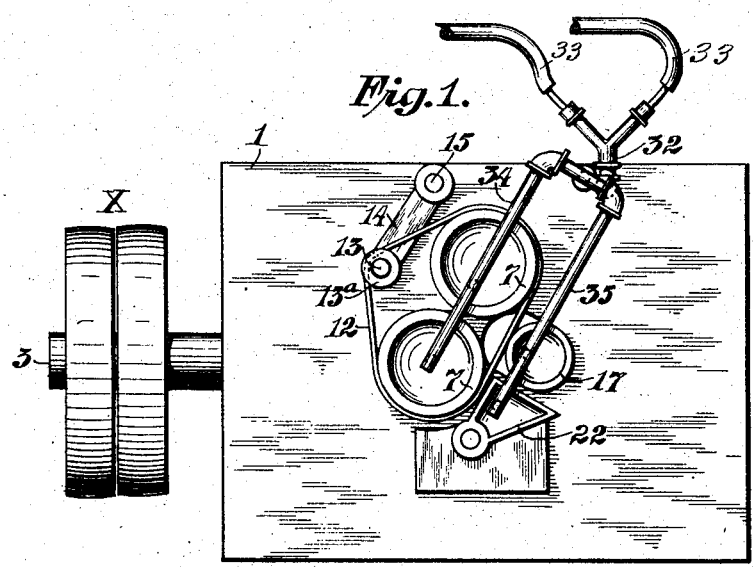
Figure 2:
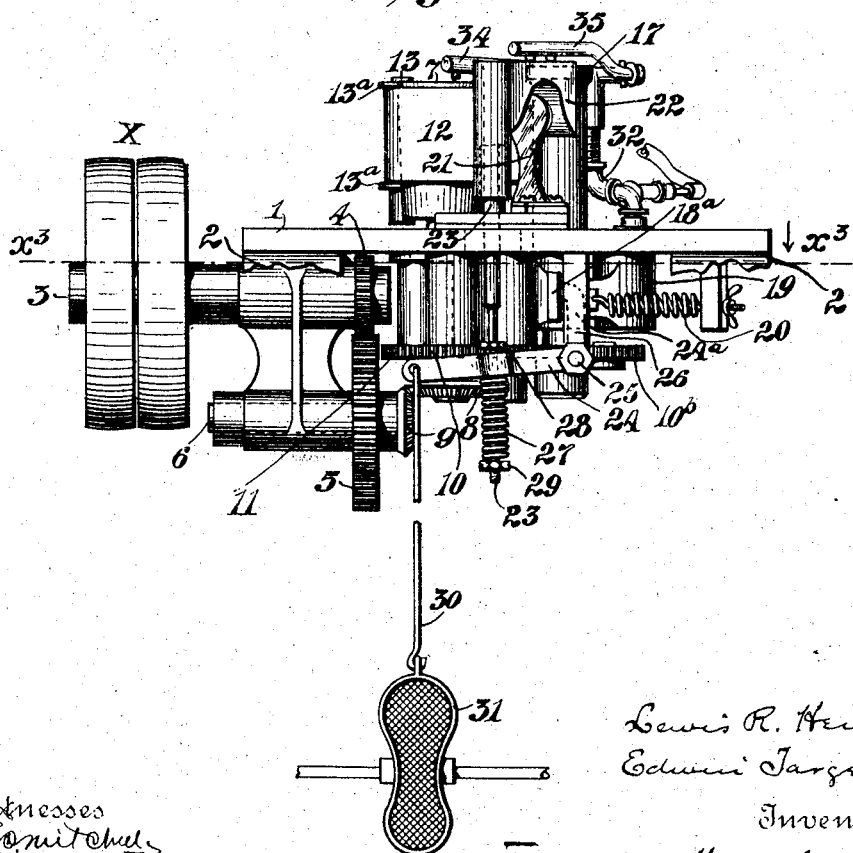

In the accompanying drawings, which serve to illustrate an embodiment of the invention, Figure 1 is a plan of the machine. Fig. 2 is a front elevation of the same, the legs being broken away. Fig. 3 is a horizontal section or sectional plan, the plane of the section being indicated by line $x^3$ in Figs. 2 and 4. Fig. 4 is a side elevation taken from the right in Fig. 1. The heating-pipes are omitted from this view.
Fig. 5 is a sectional detail view of one of the main upright rolls. Fig. 6 is a detail view of the upright ironer or shoe detached and seen in elevation, and Fig. 7 is an under-side view of the same. Fig. 8 is a detail view of the standard detached, the figure including a side and plan view on a relatively large scale. Fig. 9 is a plan of the machine, on a large scale, with the part 22 omitted and showing the rolls in operative position.
1 designates the bed of the machine, supported on suitable legs 2. Mounted rotatively in bearings on the table is the driving-shaft 3, provided with tight and loose pulleys X or with any other suitable device for driving. On the shaft 3 is a wheel 4, which gears with a wheel 5 on a counter-shaft 6 for driving the latter. Mounted rotatively in the bed are two like upright rolls 7 7, one of which is clearly illustrated in Fig. 5. On the lower end of the journal of one of these rolls is a bevel-wheel 8, which gears with a bevel-wheel 9 on the counter-shaft 6. Thus one of said upright rolls 7 is driven from the counter-shaft, and the other roll 7 is driven through the medium of gear-wheels 10 on the journals of the respective rolls 7 and an intermediate wheel 11. (Seen in Fig. 3.) The object of the intermediate wheel is to cause the rolls 7 to rotate in the same direction. About the upright rolls 7 is an endless belt 12, of some suitable fabric, preferably a woven fabric. This belt would be normally slack; but the slack is taken up by an upright roll 13, carried by a swinging arm 14, which turns about a post 15 on the bed. A spring 16, coiled about this post and coupled at one end to the arm, serves to hold the latter normally but yieldingly in the position seen in Fig. 1; but it may be drawn in toward the rolls 7.

An upright shaping-roll 17 is carried by an arm 18 below the table, said arm turning about a journal or stud 19. This roll 17 extends up through an aperture in the bed and normally occupies a position adjacent to the side of the belt 12 opposite to the take-up roll and where the belt extends normally straight across between the rolls 7, as seen in Fig. 1. The roll 17, which is a shaping-roll, is held in its normal retracted position by a spring 20 and is driven from one of the gear-wheels 10 through suitable gear-wheels $10^a$ and $10^b$, which are so disposed as to permit the swing of the roll 17 without getting out of gear.

Mounted on the bed 1 is an upright standard 21, (seen detached in Fig. 8,) of thin material, preferably metal, and extending or arching over this standard is the device 22, called the "ironer" or "shoe." This ironer has a stem 23, which extends down through the bed and plays up and down in a guideway therein, thus allowing the ironer a limited upand-down movement. The stem of the ironer extends down through an aperture in a lever 24, fulcrumed at 25 in a bracket 26, pendent from the bed, and on the said stem below the lever is a coiled spring 27. The lower portion of the stem is screw-threaded and has a nut 28 above the lever and another, 29, at its lower extremity to support the spring. To the end of the lever 24 is coupled a pendent rod 30, which extends down to a treadle 31. When the treadle is depressed by the foot, the ironer is drawn down through the resistance of the spring 27 to compression. The lever 24 has at its fulcrum an upturned arm 24$^a$, (seen in plan in Fig. 3 and in dotted lines in Fig. 2,) and this arm takes behind an extension or prolongation 18$^a$ of the arm 18, whereby when the treadle is depressed and the lever 24 rocked or turned about its fulcrum the arm 24$^a$ swings the arm 18 and presses the roll 17 inward against the belt 12 and into the space between the rolls 7, the take-up roll 13 yielding to permit of this taking up of the belt by the roll 17.

The proper operation of the machine requires that the two rolls 7, the shaping-roll 17, and the ironer 22 shall be heated to the proper degree, and this is effected by means now to be described.

Mounted on the bed is a Bunsen device 32, supplied with gas and air through suitable tubes or pipes 33 of any kind, and this device has two tubes 34 and 35, one extending over the two rolls 7, and having in its under side jet-apertures or burners, one at each roll. The other pipe extends over the shaping-roll 17 and the ironer 22 and has over each of these a downwardly-directed jet-aperture or burner. The said rolls and the shoe or ironer have hollows in their upper ends or crowns to receive the jets and facilitate the heating. In Fig. 6 the shoe is broken away to show the hollow in its top.

The rolls 7 have each a cylindrical portion $a$ at the upper end and are tapered below at $b$, Fig. 5, so that at the base the diameter is somewhat less than at the top. The take-up roll 13 has flanges 13$^a$ to embrace the upper and lower edges of the belt and prevent the latter from shifting up and down. The shoe 22 is free to rock or turn a little in a horizontal plane about the axis of its stem as a center, and it has an arched passage, (designated by $c$ in Fig. 6,) through which the collar passes. This passage $c$ is shaped substantially as represented in Figs. 6 and 7, the arch being gradually contracted from its entrance where the collar is inserted toward the end where the collar emerges and enters between the shaping-roll and the belt.

The operation of the machine is as follows: The main shaft being set in motion, the rolls 7 7 and the belt 12 are of course driven. The gas-jets from the pipes 34 and 35 are ignited, so as to heat the rolls and also the shoe or ironer 22. The attendant folds the end of a collar sufficiently to be able to insert it in the archway of the shoe 22 over the standard 21 and depresses the treadle 31. The effect of this is to draw down the shoe, so as to cause its arch to press the collar down over the smooth crown of the standard saddlewise, and it has also the effect to cause the shaping-roll 17 to move in and nip the end of the collar between said roll and the moving belt 12. The collar is thus drawn through the shoe 22 and passes between the shaping-roll 17 and the two rolls 7. The heated ironer or shoe irons the fold of the collar smoothly where said fold is pressed down on the crown of the standard, and the cylindrical upper portions $a$ on the rolls 7, in connection with the shaping-roll 17, serve to press the collar laterally at the fold and set and smooth it. The taper $b$ on the rolls 7 permits the proper flare of the outer ply of the folded collar. The flanges 13$^a$ on the take-up roll 13 keep the belt 12 in place and prevent it from working up or down on the rolls 7. Any moisture that may be in the collar along the fold will be driven out by the heat of the parts, and the heated shoe 22 irons and smooths the rounded edge at the fold, drying it at the same time. When the collar has passed out of the rolls and the pressure is removed from the treadle, the spring 20 retracts the parts.

The archway $c$ in the heated shoe or ironer is flared to a greater extent at the receiving end than at the end from which the collar emerges, as clearly shown in Figs. 6 and 7, and the crown of the standard 21 is slightly concavo-convex when seen in plan to fit the better in the fold of the collar. These parts—namely, the ironer 22 and standard 21—are non-moving when in operation and the rolls draw the collar through as distinguished from constructions where one or both of the parts roll or turn about their axes.

It will be noted that the shaping-roll 17 enters between the two rolls 7 7, pressing in the belt in a manner to form a curved way between the belt and the roll for the collar to pass through, thus imparting the desired curvature to the latter as it is drawn through from the shoe.

This invention is not restricted to all the particular details of construction herein specified, as these may be varied considerably without departing to any material extent from the invention.

Having thus described our invention, we claim—

1. A machine for the purpose specified, having rotating belt-carrying rolls, a belt thereon, a take-up device for the belt, a movable, rotating shaping-roll, means for pressing the last-named roll up against the moving belt, means for ironing the edge of the collar as it is drawn through by the rolls and belt, and means for heating the rolls and ironing means.

2. A machine for the purpose specified, having means for ironing the folded collar, rotating belt-rolls, an endless belt thereon, a laterally movable and rotating shaping-roll for pressing the collar against the moving belt, and means for heating the rolls and ironing device, the latter comprising a standard and an arched, vertically-movable ironer or shoe, and means for operating the shaping-roll and ironer.

3. A machine for the purpose specified, having two upright rolls 7, 7, cylindrical at their upper ends and tapered below, a belt 12 embracing said rolls, a yielding take-up device for the belt, a shaping-roll 17, movable toward and from said belt, for pressing the collar against the latter, means for rotating said three rolls, an ironing device for the collar, which is drawn through the ironer by said rolls and belt, and means for heating said rolls and ironer.

4. A machine for the purpose specified, having three drawing-rolls and a belt, and an ironing device for the collar through which the latter is drawn by the rolls and belt, said ironing device comprising a thin upright standard 21, and an arched shoe or ironer 22, said ironer having a stem about the axis of which it rocks horizontally and which has a limited movement up and down for pressing the collar on the standard, and a lever and treadle for operating said ironer.

5. A machine for the purpose specified, comprising a bed in which the mechanism is mounted, two belt-carrying, upright, rotating rolls which are hollow in their upper ends, a belt on said rolls, a yielding and flanged take-up roll for said belt, an upright, swinging hollowed shaping-roll adapted to be pressed against the belt between the belt-carrying rolls, means for directing gas-jets into the hollows of said rolls for heating them, means for operating the shaping-roll, and means for ironing the edge of the collar as it is drawn through the device by the rolls and belt.

6. A machine for the purpose specified, having a standard 21, an ironer 22, the latter having an arched way $c$ which overhangs said standard and a pendent stem 23 with a sliding bearing in the bed of the machine, a lever 24 through which the said stem extends downwardly, nuts on said stem, one above the lever and one below, a spring 27, on said stem between the lower nut and said lever, and a treadle and rod for drawing down the lever.

7. A machine for the purpose specified, having two upright belt-rolls, means for driving said rolls, a belt on said rolls, a yielding take-up roll for the slack of said belt, an upright shaping-roll 17, rotatively mounted in a swinging arm 18, whereby the shaping-roll may be moved up to and away from said belt, a spring to retract said arm, a lever 24, having an arm $24^a$ which bears on some part of the arm 18 for operating the roll 17, and means for operating said lever.

In witness whereof we have hereunto signed our names, this 15th day of January, 1903, in the presence of two subscribing witnesses.

LEWIS R. HEIM.
EDWIN TARGETT.

Witnesses:
JACOB S. WARREN,
CHRISTIAN QUIEN.